United States Patent
McReynolds et al.

(10) Patent No.: US 11,880,719 B2
(45) Date of Patent: Jan. 23, 2024

(54) TRUST-AWARE AND ADAPTIVE SYSTEM TO AID VIRTUAL/HUMAN INTERVENTION USING AN API-BASED MECHANISM

(71) Applicant: Dell Products L.P., Round Rock, TX (US)

(72) Inventors: Anne-Marie McReynolds, San Jose, CA (US); Nicole Reineke, Northborough, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/648,480

(22) Filed: Jan. 20, 2022

(65) Prior Publication Data
US 2023/0229526 A1 Jul. 20, 2023

(51) Int. Cl.
*G06F 3/00* (2006.01)
*G06F 9/54* (2006.01)

(52) U.S. Cl.
CPC .................... *G06F 9/54* (2013.01)

(58) Field of Classification Search
CPC ........................................ G06F 9/54
USPC ....................................... 719/328
See application file for complete search history.

(56) References Cited

U.S. PATENT DOCUMENTS

| | | | | |
|---|---|---|---|---|
| 7,484,245 B1 * | 1/2009 | Friedman | ........ | G06F 21/62 726/28 |
| 11,449,602 B1 * | 9/2022 | Tumblin | ........ | G06F 21/602 |
| 2007/0093234 A1 * | 4/2007 | Willis | ........ | G06F 21/6245 455/410 |
| 2007/0136811 A1 * | 6/2007 | Gruzman | ........ | G06F 21/562 726/24 |
| 2013/0024929 A1 * | 1/2013 | Abraham | ........ | G06F 21/52 726/16 |
| 2013/0291098 A1 * | 10/2013 | Chung | ........ | G06F 21/577 726/21 |
| 2015/0186669 A1 * | 7/2015 | Nicolaou | ........ | G06F 21/6218 726/4 |
| 2015/0350174 A1 * | 12/2015 | Reno | ........ | H04L 63/1433 726/25 |
| 2015/0350234 A1 * | 12/2015 | Reno | ........ | H04L 67/02 726/25 |
| 2016/0203319 A1 * | 7/2016 | Coen | ........ | G06Q 30/0185 726/25 |
| 2016/0259934 A1 * | 9/2016 | Rozenberg | ........ | H04L 63/102 |

(Continued)

FOREIGN PATENT DOCUMENTS

WO    WO-2013012592 A1 *   1/2013   .......... G06F 21/51

OTHER PUBLICATIONS

Sarah Majoul, Enforcing Trust in Home Automation Platforms . (Year: 2010).*

(Continued)

*Primary Examiner* — Lechi Truong
(74) *Attorney, Agent, or Firm* — Workman Nydegger (57) ABSTRACT

A method for generating a trustworthiness score for an automation call is disclosed. An automation database may return trust information for multiple trust indicators. A current score may also be determined. The trust information provides insight into the trustworthiness of the automation call. When an error is encountered with the call or in a user interface, the trust system may intervene based on the user sentiment. The intervention may be automatic, and computer or human based.

16 Claims, 6 Drawing Sheets

(56) References Cited

U.S. PATENT DOCUMENTS

2017/0083392 A1* 3/2017 Lupescu ............... G06F 9/50
2019/0318079 A1* 10/2019 Sandoval ............. G06F 21/52
2019/0334943 A1* 10/2019 Arvanites ............ H04W 4/023
2020/0074542 A1* 3/2020 Manna ................. G06F 9/54
2020/0394318 A1* 12/2020 Bahrami ............. G06F 16/986
2021/0176066 A1* 6/2021 Keith, Jr. ............ G06F 21/606

OTHER PUBLICATIONS

William Conner, A Trust Management Framework for Service-Oriented Environments. (Year: 2009).*
Hamda Al-Breiki, Trustworthy Blockchain Oracles: Review, Comparison, and Open Research Challenges. (Year: 2020).*
Chiou, et al., Trusting Automation: Designing for Responsivity and Resilience, Apr. 2021.
Mattson, et al., Comparing quantifiable methods to measure complexity in assembly, Int. J. Manufacturing Research, vol. 9, No. 1, pp. 112-130, 2014.

* cited by examiner

TRUST-AWARE AND ADAPTIVE SYSTEM TO AID VIRTUAL/HUMAN INTERVENTION USING AN API-BASED MECHANISM

FIELD OF THE INVENTION

Embodiments of the present invention generally relate to a trust-based system and automation calls. More particularly, at least some embodiments of the invention relate to systems, hardware, software, computer-readable media, and methods for calibrating trustworthiness in automation calls including in application programming interfaces (APIs).

BACKGROUND

Hyperscaling relates to the ability to scale a system or application in response to increased demand. Hyperscaling often relies on automated calls. Unfortunately, there is often a lack of trust in automation calls and the lack of trust is not limited to hyperscaling scenarios. More specifically, insight or information related to the trustworthiness of an automated call is typically unavailable. The lack of information regarding trust can have a negative impact in complex automation at least from a user or developer's perspective.

Automation calls facilitate outcome-based control and are becoming increasingly common. Although outcome-based control is useful, the downside is that developers have little visibility into the various steps of the outcome-based automation call. This makes it difficult to understand whether an entity's goals are aligned with the automation intent. Even though no system can fully run without a person, clouds and automation calls eliminate visibility into trustworthiness beyond device specific operations.

When assessing an automation call, traditional quality of service (QoS) metrics and key performance indicators (KPIs) do not account for developer personas and rely solely on web analytics for sentiment analysis. More specifically, graphical user interfaces (GUIs) used to call APIs do not include or display the minimum qualitative measures of consumer satisfaction (e.g., consumer satisfaction score (CSAT) or Net Promoter Score (NPS)). Rather, user sentiment is typically inferred from clickstream data. As a result, consumer satisfaction and trust can be diminished.

In fact, the lack of behavioral observability can adversely impact trustworthiness and makes it difficult to intervene at the appropriate time when problems with an automation call arise. The interactions built into some systems are built to support services, which is distinct from supporting or incorporating human trust. Some products may reduce complexity by unifying management functions across multi-vendor solutions into a single pane, but even with reduced complexity, the lack of visibility into the automation activities reduces trust and increased perceived vulnerability.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to automation calls and to generating trustworthiness scores for automation calls such as declarative and outcome-based calls. More particularly, at least some embodiments of the invention relate to systems, hardware, software, computer-readable media, and methods for determining trustworthiness scores for automation calls and to providing aid or assistance to users based on user current scores.

Embodiments of the invention are discussed in the context of application programming interface (API) calls but are not limited thereto. Embodiments of the invention provide a mechanism that allows developers (or other users) to receive information related to the trustworthiness of an API.

More specifically, an automation database is provided that stores trustworthiness information for APIs that is based on observable properties such as performance, process, and purpose. These properties, when presented to a user, allow the user to have an understanding of the API's trustworthiness and allows misaligned automation intent to be detected. The automation database may also store complexity scores for the APIs and may also store predetermined or precalculated sentiment or current scores.

Intervention (e.g., providing or offering assistance to a user) can be performed virtually and/or in person when necessary based on users' current scores. Embodiments of the invention may also reduce the time to intervention by detecting when intervention may be beneficial and prompting the user with the offered assistance.

A graphical user interface (GUI) may be provided to provide a user with information regarding the trustworthiness of the API. The trustworthiness, by way of example and not limitation, may be expressed in terms of what the automation call can do (performance), how the outcome is achieved (process) and why actions are taken (purpose). In addition, a feedback loop allows a user to provide feedback on the accuracy of the trustworthiness and complexity scores. Further, embodiments of the invention may deploy a virtual/human assistant as a first responder to current scores that indicate a negative sentiment or mistrust. For example, a knowledge base may be provided for low complexity and high-trust automation activities and a human may be made available for high complexity or low-trust actions.

Embodiments of the invention relate to a trust-sentiment aware system that calibrates trustworthiness in automation. Trustworthiness is objectively scored based on trust indicators including performance, process, and purpose. Trustworthiness can also be evaluated subjectively by enabling user feedback.

The automation database allows the builders of APIs to include intent data. As a result, this allows the APIs themselves to explain their intent, which allows accountability, explainability, and transparency to be scored. Workload complexity can also influence the trustworthiness and may be considered when determining the trust sentiment.

Figure 1A:
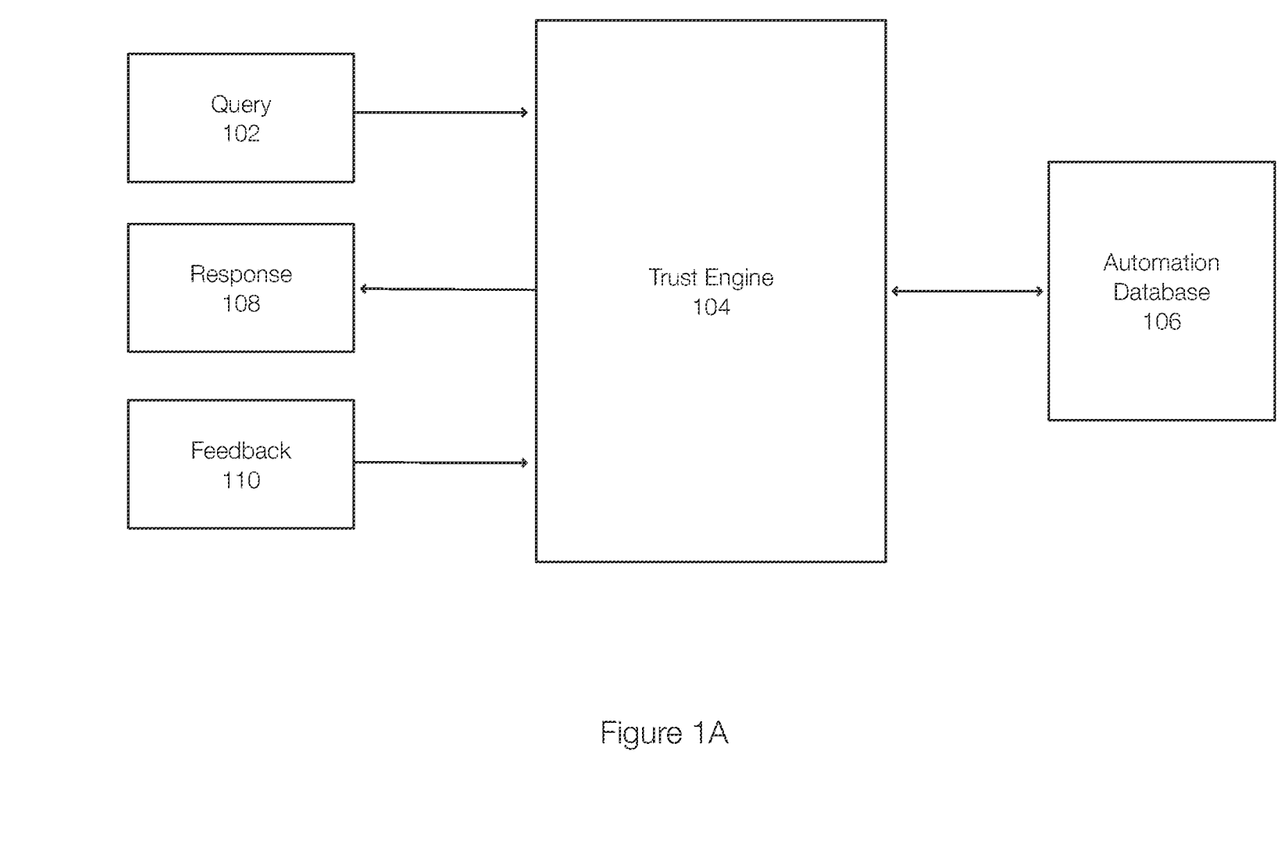
FIG. 1A discloses aspects of a trust engine configured to provide trust information related to automation calls.

FIG. 1A discloses aspects of a trust engine configured to aid the use of automation calls such as API calls. FIG. 1 illustrates a trust engine 104 that is associated with an automation database 106. The trust engine 104 may be implemented as a virtual machine, a physical machine, a container or the like and may present a user interface to a user.

In one example, the trust engine 104 is configured to aid in the selection of an API call based on the API's trustworthiness as recorded or stored in the automation database 106. The trust information stored in the automation database 106 may be determined over time, based on user feedback, based on information provided by the API developer, surveys, reviews, or the like. The trust information may be generated using qualitative measures of consumer satisfaction such as CSAT (Customer Satisfaction Score) and NPS (Net Promoter Score).

In one example, the current score of the API may be based on the presence or absence of trust indicators (e.g., performance, purpose, process) and/or the complexity score. The presence of each indicator may be a +1 while the absence of the indicator may be a −1. These values may be summed and then multiplied by the complexity score. Other methods of determining a current score may be used.

Once the automation database 106 is prepared or even during development, the trust engine 104 may receive a query 102 from a user. The query 102 may identify one or more automation calls. For example, the user may be a developer and may have many options regarding how to automate their deployment models. The developer may want to choose between automation APIs.

The query 102 allows the developer to query the automation database 106 regarding the relevant automation calls. In this example, the automation database 106 does not contain or store the actual automation calls. Rather, the automation database 106 stores trust information such as performance information, process information, purpose information, and complexity information. The trust information may be stored as a score, as a description (text), graphical form, or the like.

In this example, the trust engine 104 may retrieve the trust information from the automation database 106 and present the trust information as a response 108 to the developer. The response 108 may be provided in user-readable form. The response 108 may include trustworthiness information of the calls identified in the query 102. One of the calls identified in the response 108 may be selected by a user.

The trust engine 104 may generate a rating or a current score based on the trust information. Thus, the information presented to the user may include ratings for the API, ratings for each trust indicator, text to describe the trust indicators to a user, scores, or the like or combination thereof. The developer may then select one of the APIs for use in their projects or code being developed based on the trust information obtained from the automation database 106.

This allows trust information to be incorporated into the user's development process and gives the developer insight into the workings of the automation call. The developer may be able to provide feedback 110 in the form of, by way of example, ratings with regard to the purpose, process, and/or performance of the API. If the developer identifies a performance issue, the feedback 110 may be in the form of a request for lower scoring or in the form of a negative review that may be included in the text.

Figure 1B:
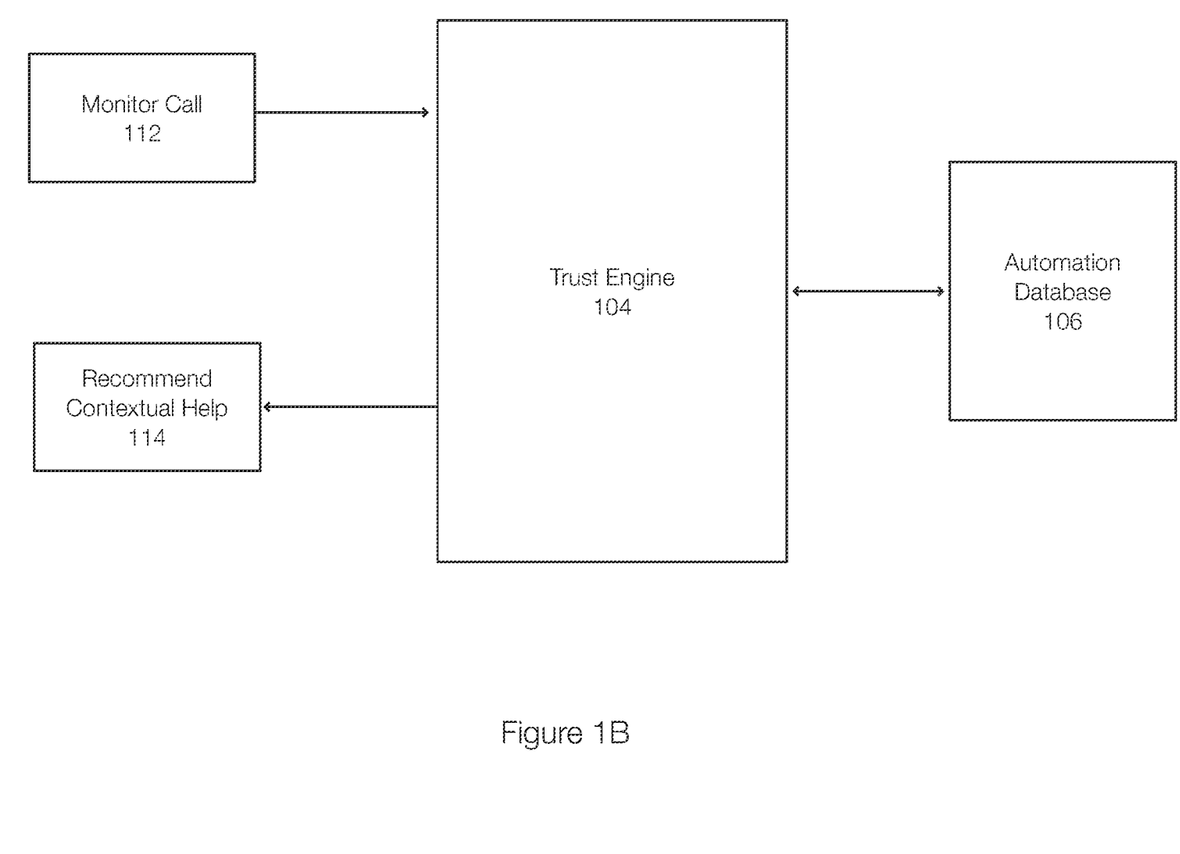
FIG. 1B discloses additional aspects of the trust engine, including providing contextual help to users.

FIG. 1B discloses aspects of the trust engine for recommending a support approach or for reducing the time to intervention. In this example, a user may have selected an API and may actually call the API in order to perform an action. The trust engine 104 may monitor the API call or may receive information related to the execution of the API call, such as errors.

If an error is detected in the execution of the action or execution of the API call, the trust engine 104 may recommend contextual help 114. The type of help recommended may depend on a complexity score, the trust information, and/or the current score. For example, automated or virtual help (e.g., a knowledge base) may be recommended for API calls associated with low complexity scores (and/or low current scores) while human help (e.g., a chat session, a direct call with support) may be recommended or offered when the complexity score or current score is higher.

Figure 1C:
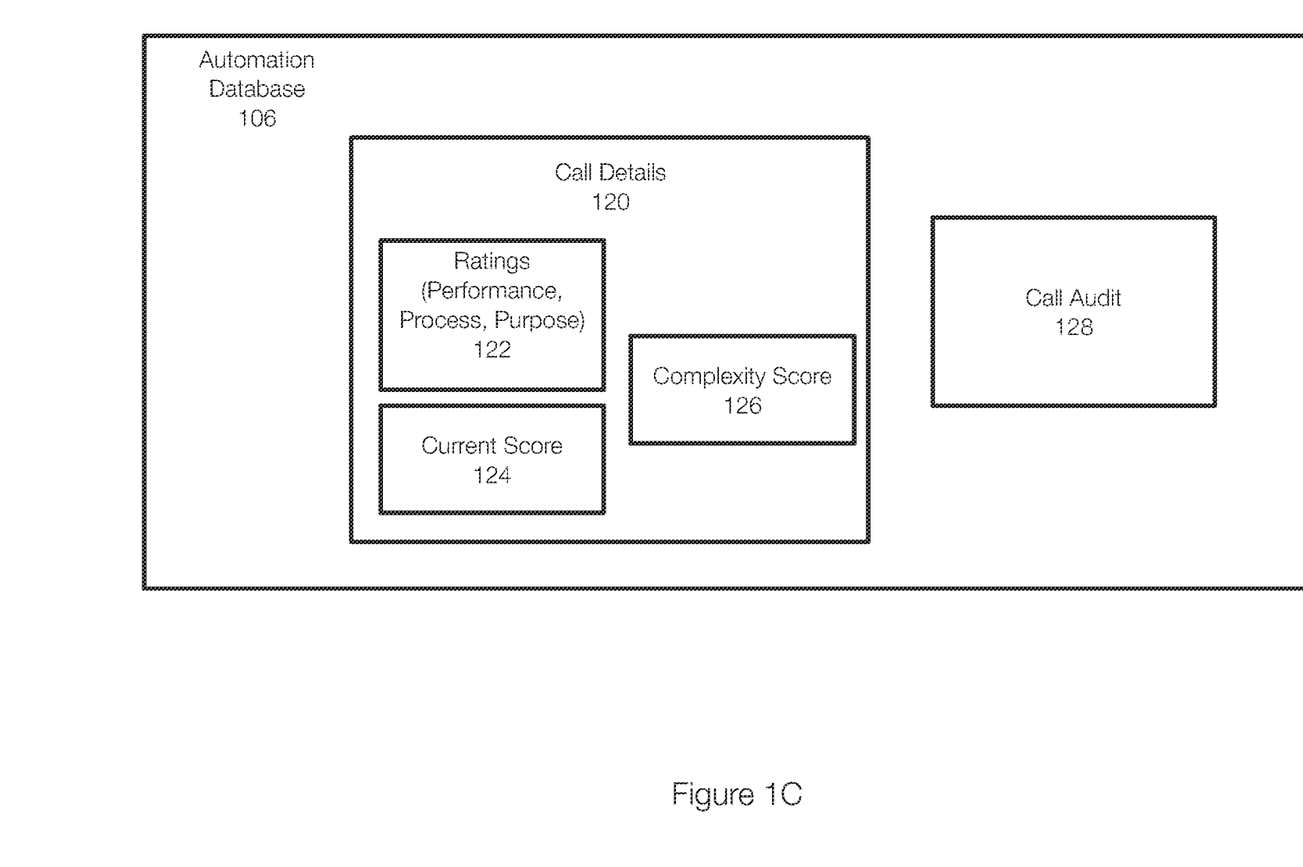
FIG. 1C discloses aspects of an automation database.

FIG. 1C discloses aspects of the automation database 106. Generally, the automation database stores call details 120. The call details 120 include trustworthiness information for each trust indicator. For example, the call details 122 may include validated ratings 122 for the trustworthiness of API calls. The ratings 122 may include, by way of example only, ratings for performance, ratings for process, and ratings for purpose. The call details 120 may also include text, which may have been provided by a developer of the API, for one or more of the trust indicators.

The call details 120 may also include a precalculated current score 124. This represents, in one example, what is known about a current logged-in user's perception of an API call or product. This may be gathered through microfeedback or through monitoring of social or support feedback on a phone call. The more errors associated with the user and the API call, the lower the current score. This can be done with any number of calculations. In one example, the current score starts with a score of 100%, where all known interactions are positive. Each negative interaction (error returned, complaint filed as a support ticket or non-5-star review added in a microfeedback request), causes N to be subtracted from the current score. As previously stated, the current score 124 may be based on the presence or absence of the feedback indicators. The ratings 122 may also include information that can be provided to the user in various ways, such as a graphical form and/or a textual form.

In one example, the call details 120 may store the ratings (or other trust information) in tables. The table for the call details 120 may include, for each API call, the API call's name, purpose, performance, process, complexity score, and recursive API array. The recursive API array may identify APIs called by the API and may be related to the complexity score.

The call audit 128 allows use of the call details 120 to be tracked for auditing on an entity basis, a user basis, or the like. The call audit 128 may be represented by a table that stores, for each access of the automation database 106 a timestamp, a reference to the API accessed, and user scores for purpose, performance, process, and complexity. The call audit 128 may track errors that occurred, microfeedback, or other sentiment indicators that occur. An overall user score may also be stored in the call audit 126. This information allows an audit to be performed and may allow the current score and other trust information to be tracked over time.

Figure 1D:
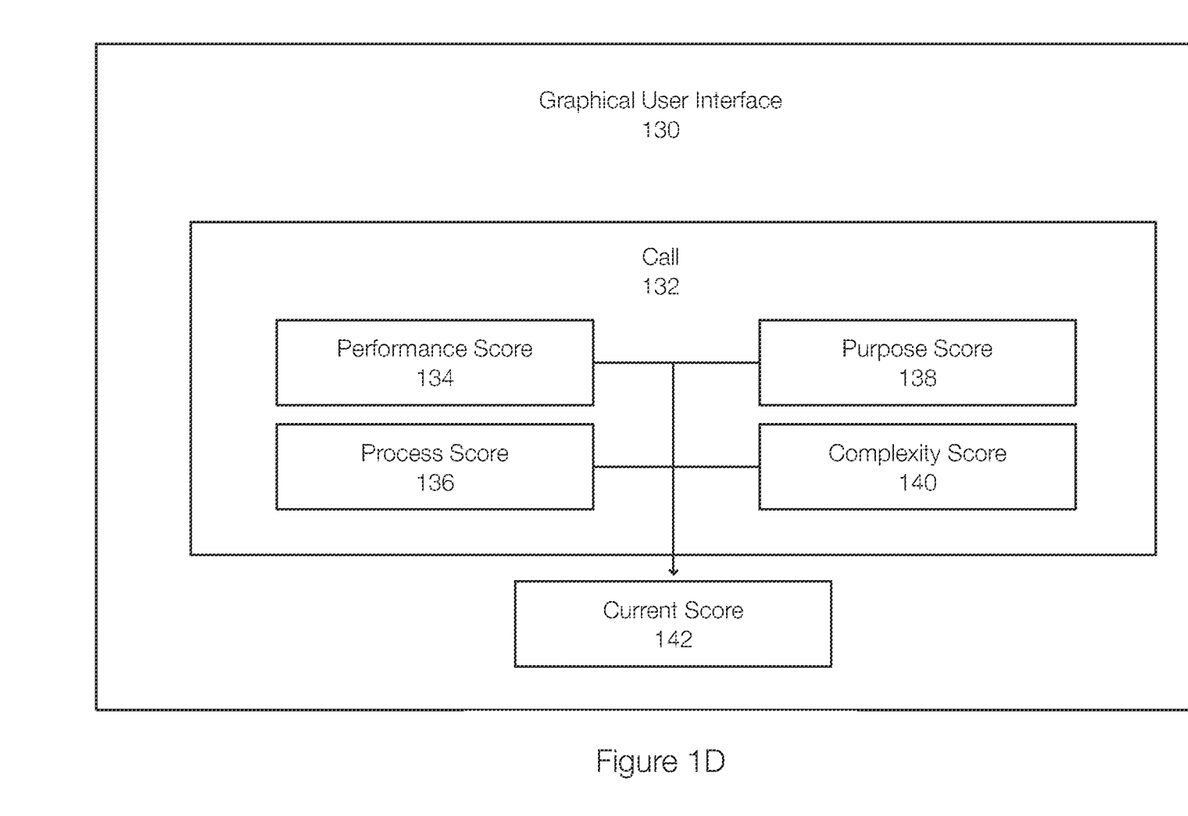
FIG. 1D discloses aspects of a graphical user interface configured to interface with an automation database.

FIG. 1D discloses aspects of a graphical user interface. The interface 130 may be used for various purposes including, but not limited to, issuing a query or request to the automation database, displaying a response from the automation database, presenting help options to a user, calling an API, or the like or combination thereof.

In this example, the interface 130 is displaying a response that includes trust information related to a specific call 132. The trust information includes a performance score 134, a process score 136, a purpose score 138, and a complexity score 140. The scores 134, 136, 138, and 140 may be represented as numbers, as text, as graphics, ratings, or the like or combination thereof. Generally, the trust information is presented for each trust indicator. The trust information for the call 132 is presented in a form that can be interpreted by the user. A current score 142 may also be determined or calculated and provided in the response.

Figure 2:
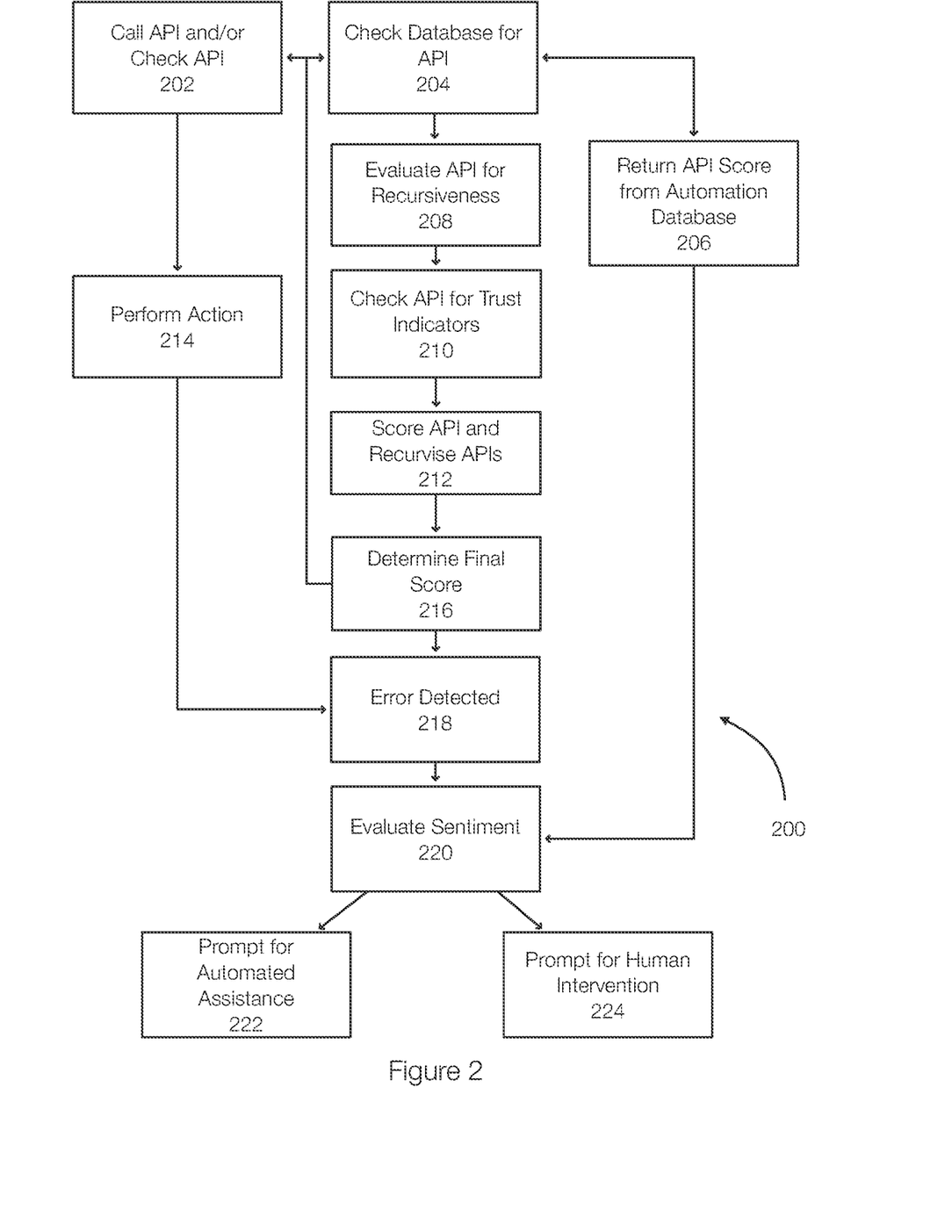
FIG. 2 discloses aspects of a method for performing trust related operations including operations related to automation calls.

FIG. 2 discloses aspects of a method for performing trust related operations. The method 200 includes at least related aspects of trust operations. More specifically, the method 200 may include portions or methods than may be performed separately, sequentially, or concurrently. One portion of the method 200 relates to FIG. 1A, which allows a user to select an API from a plurality of APIs based on the trust information. Another portion of the method 200 relates to FIG. 1B, which allows the trust system to intervene when an error is detected. Some of the elements of these portions may be the same. These aspects of the method 200 often begin when an API is checked and/or called 202. In one example, a user may wait until trustworthiness information is returned from the automation database prior to actually calling the API.

Assuming that a request for a trust rating or trust information is generated (check 202 the API), the automation database is queried or checked 204 for the APIs identified in the request. In one example, the request is made to obtain purpose information, process information, and process information. The response 206, if the API identified in the request is in the automation database, may include values including purpose values, process values, and performance values. As previously stated, these values may be scores, ratings, strings, or the like. The response from the automation database may also include a complexity score, which may be represented as a number. If the API is recursive or an experience API (the API calls other APIs), information on other APIs related to the API identified in the request may also be returned. The recursive nature of the API may be reflected in the complexity score.

At this point and if the API is present in the automation database, the trust information and/or the complexity score may be returned to the user. If multiple APIs were identified in the request and the response included trust information for the identified APIs, the user may be able to select one of the APIs for use based on the trust information and/or the complexity score. The selected API may be called, for example, and an action performed 214.

If the API identified in the request is not present in the automation database, the trustworthiness score may be determined from trustworthiness indicators and complexity indicators. More specifically, the API may be evaluated 208 for recursiveness. The API, including the APIs included in or associated with the requested API, are checked 210 for trust indicators. This may be achieved by calling the APIs. Calling the APIs may receive a response indicating whether trust indicators are present and may identify which trust indicators are present.

More specifically, if the response from called APIs indicate the presence of process, performance, purpose, and complexity, this information is used to score 212 the API. More specifically, a determination is made as to whether trust information for process, performance, purpose, and complexity score is available for each of the APIs and the score is determined accordingly.

Scoring 212 may include, for each API, making an adjustment based on whether any of the indicators are present/absent. For example, if process, purpose, and performance information is not available, the current score is decreased. If the complexity score is not available, the current score is decreased. If the indicators exist, the current score is adjusted based on the complexity score. If the score started from 0, then the final current score may be negative or positive, which is of itself an indication of trustworthiness.

The score may be determined as follows for each API, by way of example only:

1) if process indicator does not exist, decrease current score by 1;
   if purpose indicator does not exist, decrease current score by 1;
   if performance indicator does not exist, decrease current score by 1; and
   if complexity score does exist, multiply current score by 10; or
2) if complexity score exists, multiple the current score by the complexity score.

In this example, the presence of an indicator may increase the current score by 1. Once these determinations for the API are completed, the final score is determined 216. This manner of scoring is illustrated by way of example only. Thus, the API, which is not in the automation database, has a current score.

More generally, the presence and/or absence of the trust indicators and/or the complexity score will be used to augment any current score for the API. This can be used as a multiplier or in another way to generate a current score. The current score is an example of a trust score plus sentiment score for the API or call. For example, an API with a trust score of 100, but a sentiment score of 10/100 may have a current score of only 50% as the trust is impacted by perceived negative experience.

Next, an error may be detected 218 in response to an action 214. The API may be called, for example, and an error may be returned or experienced. When an error is detected, the current score is evaluated 220. The comparison between the current score (the final current score) and a threshold level, as illustrated in the method 200, determines how to intervene. Further, the error may also be used to lower the current score.

When the current score is below a threshold score, a prompt for human intervention 224 may be provided. Stated differently, a negative trust indication may be resolved more effectively through human intervention. If the current score is above a threshold value, a prompt 222 for automated assistance may be provided.

By including a complexity score, the complexity can influence the trustworthiness of the API by incorporating the complexity score with the current score generated from the trust indicators.

Thus, the trust engine can determine a trust sentiment score by accessing the score from an automation database or by calculating the current score using the combination of sentiment scores and the availability of trust indicators. When an error code is returned, the current score is assessed, and a support remediation mechanism is recommended based on the current score.

Finally, the audit may be used to gauge frequency of utilization, the likelihood of failures, and to generate proactive support services or update recommendations to the API vendors. As automation or API calls are updated overtime, a historical indication of is maintained. The historical indication or information relates not just to specific API calls, but the API calls and any versions of the API call that may be released. For example, call XZY is released as XZY1.0 in October 2023. In November 2023, a bug fix requires release of XZY1.1. The automation database stores the major API version as well as the versioned release number for audit queries to be performed against all types of XZY calls as well as specific API calls.

Embodiments of the invention relate to evaluating the interaction between users and automation calls and provided improved intervention. A current score is generated and may be based on the presence/absence of trust indicators. This allow the current score to be objectively determined. The current score for a user can also be subjectively adjusted based on user feedback. The current score may also account for the cumulative transparency of the API. By calibrating or assessing the trustworthiness of an automation call, such as with the current score, the time-to-intervention can be assessed and provided in a flexible manner.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, trust related operations such as rating generation operations, score calculation operations, intervention operations, trust-based API selection operations, or the like or combination thereof.

Example cloud computing environments, which may or may not be public, include storage environments that may provide trust related functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, containers, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a request for trust information for an automation call, accessing an automation database in response to the request to retrieve the trust information, wherein the trust information includes text for one or more trust indicators, and presenting a response that includes the trust information, wherein use of the automation call is based at least in part on the trust information.

Embodiment 2. The method of embodiment 1, further comprising determining a current score for the automation call.

Embodiment 3. The method of embodiments 1 and/or 2, further comprising, when the automation call is not present in the automation database, determining a trust score based on a presence or absence of trust indicators.

Embodiment 4. The method of embodiments 1, 2, and/or 3, further comprising determining the presence or absence of trust indicators by calling the automation call.

Embodiment 5. The method of embodiments 1, 2, 3, and/or 4, further comprising detecting an error related to calling the automation call.

Embodiment 6. The method of embodiments 1, 2, 3, 4, and/or 5, further comprising intervening to provide assistance in response to the detected error.

Embodiment 7. The method of embodiments 1, 2, 3, 4, 5, and/or 6, further comprising providing an automated assistance when the current score (the culmination of a trust score and a sentiment score) of the automation call is greater than a threshold value and providing human assistance when the current score is less than the threshold value.

Embodiment 8. The method of embodiments 1, 2, 3, 4, 5, 6, and/or 7, wherein the current score is based on a combination of scores from the presence or absence of the trust indicators and a complexity score.

Embodiment 9. The method of embodiments 1, 2, 3, 4, 5, 6, 7, and/or 8, wherein the complexity score is higher when the automation call is an experience automation call.

Embodiment 10. The method of embodiments 1, 2, 3, 4, 5, 6, 7, 8, and/or 9, wherein the automation call is an application programming interface (API) call.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
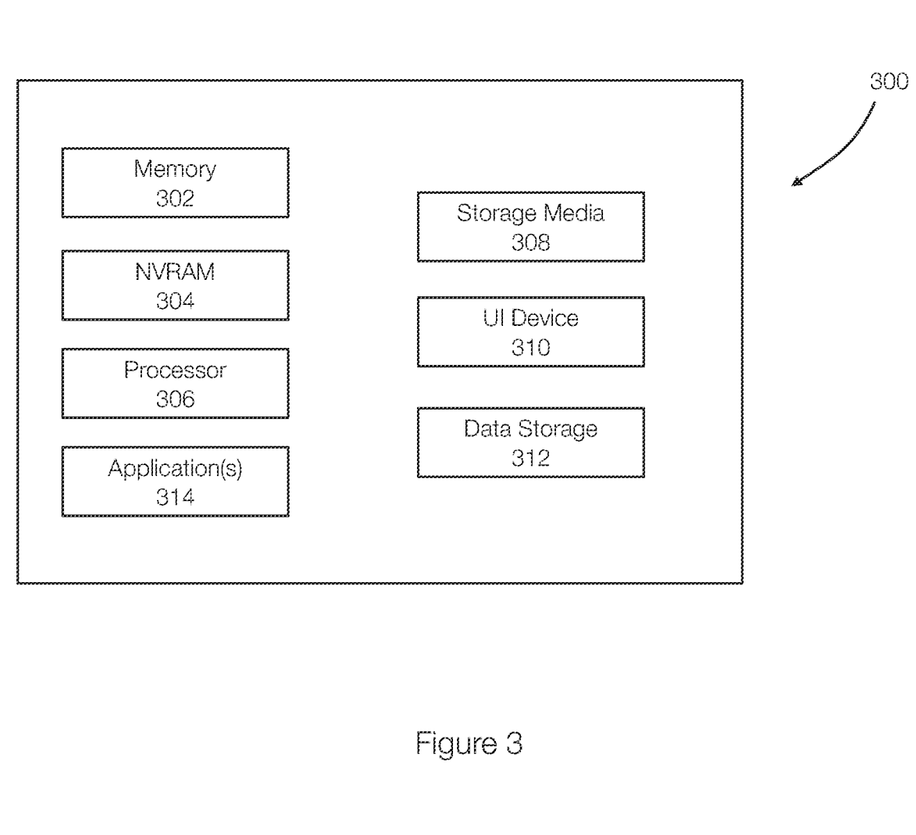
FIG. 3 discloses aspects of a computing device or a computing system.

With reference briefly now to FIG. 3 any one or more of the entities disclosed, or implied, by FIG. 3 and/or elsewhere herein, may take the form of, or include, or be implemented on, or hosted by, a physical computing device or a computing system, one example of which is denoted at 300. As well, where any of the aforementioned elements comprise or consist of a virtual machine (VM) or container, that VM or container may constitute a virtualization of any combination of the physical components disclosed in FIG. 3.

In the example of FIG. 3, the physical computing device 300 includes a memory 302 which may include one, some, or all, of random-access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid-state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a request for trust information for an automation call;
accessing an automation database in response to the request to retrieve the trust information, wherein the trust information includes text for one or more trust indicators;
determining a sentiment score from the automation database;
generating a current score for the automation call based on the one or more trust indicators and the sentiment score;
comparing the current score to a threshold level; and
presenting a response, based on the comparison, that includes the trust information, wherein use of the automation call is based at least in part on the trust information;
when the automation call is not present in the automation database, generating the current score based on a presence or absence of trust indicators.

2. The method of claim 1, further comprising determining the presence or absence of trust indicators by calling the automation call.

3. The method of claim 1, wherein the current score is based on a combination of scores from the presence or absence of the trust indicators and a complexity score.

4. The method of claim 3, wherein the complexity score is higher when the automation call is an experience automation call.

5. The method of claim 1, further comprising detecting an error related to calling the automation call.

6. The method of claim 5, further comprising intervening to provide assistance in response to the detected error.

7. The method of claim 6, further comprising providing an automated assistance when a current score of the automation call is greater than a threshold value and providing human assistance when the current score is less than the threshold value, wherein the current score is a combination of a trust score and the sentiment score.

8. The method of claim 1, wherein the automation call is an application programming interface (API) call.

9. A non-transitory storage medium having stored therein instructions that are executable by one or more hardware processors to perform operations comprising:
receiving a request for trust information for an automation call; accessing an automation database in response to the request to retrieve the trust information, wherein the trust information includes text for one or more trust indicators;
determining a sentiment score from the automation database;
generating a current score for the automation call based on the one or more trust indicators and the sentiment score;
comparing the current score to a threshold level; and
presenting a response, based on the comparison, that includes the trust information, wherein use of the automation call is based at least in part on the trust information;
when the automation call is not present in the automation database, generating the current score based on a presence or absence of trust indicators.

10. The non-transitory storage medium of claim 9, further comprising determining the presence or absence of trust indicators by calling the automation call.

11. The non-transitory storage medium of claim 9, wherein the current score is based on a combination of scores from the presence or absence of the trust indicators and a complexity score.

12. The non-transitory storage medium of claim 11, wherein the complexity score is higher when the automation call is an experience automation call.

13. The non-transitory storage medium of claim 9, further comprising detecting an error related to calling the automation call.

14. The non-transitory storage medium of claim 13, further comprising intervening to provide assistance in response to the detected error.

15. The non-transitory storage medium of claim 14, further comprising providing an automated assistance when a current score of the automation call is greater than a threshold value and providing human assistance when the current score is less than the threshold value, wherein the current score is a combination of a trust score and the sentiment score.

16. The non-transitory storage medium of claim 9, wherein the automation call is an application programming interface (API) call.

* * * * *